(12) United States Patent
Kaun (10) Patent No.: US 11,211,779 B2
(45) Date of Patent: Dec. 28, 2021

(54) CABLE LEAD-THROUGH ASSEMBLY, ELECTRICAL ASSEMBLY, AN ELECTRICAL CABINET AND ASSOCIATED METHOD

(71) Applicant: FRAMATOME, Courbevoie (FR)

(72) Inventor: Norman Kaun, Erlangen (DE)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 16/756,557

(22) PCT Filed: Oct. 17, 2017

(86) PCT No.: PCT/IB2017/001678
§ 371 (c)(1),
(2) Date: Apr. 16, 2020

(87) PCT Pub. No.: WO2019/077387
PCT Pub. Date: Apr. 25, 2019

(65) Prior Publication Data
US 2020/0287369 A1   Sep. 10, 2020

(51) Int. Cl.
*H02G 3/22* (2006.01)
*H02B 1/30* (2006.01)
(Continued)

(52) U.S. Cl.
CPC ............ *H02G 3/22* (2013.01); *H02B 1/305* (2013.01); *H02G 3/0456* (2013.01); *H02G 3/32* (2013.01)

(58) Field of Classification Search
CPC .......... H02G 3/22; H02G 3/32; H02G 3/0456; H02G 3/24; H02G 3/26; H02G 3/30;
(Continued)

(56) References Cited

U.S. PATENT DOCUMENTS 3,489,440 A * 1/1970 Brattberg ............... F16B 2/065
                                                                248/56
4,702,444 A * 10/1987 Beele ...................... H02G 3/22
                                                                248/56
(Continued)

FOREIGN PATENT DOCUMENTS

EP      1705769 A2     9/2006
EP      3139459 A1     3/2017
(Continued)

OTHER PUBLICATIONS

Corresponding Search Report PCT/IB2017/001678.

*Primary Examiner* — Angel R Estrada
(74) *Attorney, Agent, or Firm* — Davidson, Davidson & Kappel, LLC (57) ABSTRACT

A cable lead-through assembly (2) includes s frame (10) delimiting a cable reception space (20); and an in-frame sub-system (11) configured for securing cables (1) to the frame (10). The in-frame sub-system (11) includes at least two plates (32) intended for extending in said cable reception space (20), the plates (32) being configured for being coupled to the frame (10) and for forming between each other at least one cable's path for at least one cable (1); securing means (14) configured for securing the or each cable (1) to a corresponding plate (32); and a locking unit (16) coupled to the frame (10). The locking unit (16) has an at-rest configuration and an operational configuration. The locking unit (16) is configured for displacing the plates (32).

16 Claims, 4 Drawing Sheets

(51) Int. Cl.
*H02G 3/04* (2006.01)
*H02G 3/32* (2006.01)

(58) Field of Classification Search
CPC ........ H02G 3/36; H02G 15/007; H02G 3/083; H02G 3/00; H02G 3/08; H02G 3/081; H02B 1/305; B60R 16/0222; B60R 16/0215; H01R 43/20
USPC ............ 174/650, 152 G, 153 G, 135, 152 R, 174/72 A, 137 R, 142, 668, 659, 155, 174/156, 664, 657; 285/3, 4; 248/68.1, 248/49; 16/2.1, 2.2
See application file for complete search history.

(56) References Cited

U.S. PATENT DOCUMENTS

| | | | |
|---|---|---|---|
| 4,919,372 A * | 4/1990 | Twist | H02G 3/22 248/56 |
| 5,493,068 A | 2/1996 | Klein et al. | |
| 5,783,776 A | 7/1998 | Birmingham et al. | |
| 7,288,730 B2 * | 10/2007 | Habel | H02G 3/22 16/2.1 |
| 9,142,946 B2 * | 9/2015 | Krager | H02G 3/32 |
| 9,350,152 B2 * | 5/2016 | Andresen | H02G 3/22 |
| 10,371,182 B2 * | 8/2019 | Milton | H02G 3/22 |
| 10,622,795 B2 * | 4/2020 | Karlsson | H02G 3/22 |
| 2005/0115733 A1 * | 6/2005 | Kreutz | H02G 3/22 174/652 |

FOREIGN PATENT DOCUMENTS

| | | |
|---|---|---|
| WO | WO9322815 | 11/1993 |
| WO | WO2010090582 A1 | 8/2010 |
| WO | WO2012034988 | 3/2012 |

* cited by examiner

CABLE LEAD-THROUGH ASSEMBLY, ELECTRICAL ASSEMBLY, AN ELECTRICAL CABINET AND ASSOCIATED METHOD

The present invention relates to a cable lead-through assembly comprising a frame delimiting a cable reception space. The present invention also relates to an electrical cabinet comprising such a cable lead-through assembly and to a method for assembling the cable lead-through assembly.

In use, electrical or data transmission cables entering an electrical cabinet, a switch box or a distribution bay may be subjected to axial forces, such as pushing or pulling forces in the direction of their axis, due to human influence or to natural phenomena resulting from their environment, such as earthquakes. In the absence of protective measures, such forces may cause the disconnection of the cables in the electrical cabinet.

BACKGROUND

In order to reduce the risk of such a disconnection, the cables may pass through cable lead-through assemblies prior to entering the corresponding electrical cabinet or distribution bay.

These cable lead-through assemblies are configured for providing strain relief by absorbing axial forces applied on the cable.

Furthermore, in such cable lead-through assemblies, the cables are grounded, in order to discharge undesired electromagnetic loads off the cable. Such grounding is for example required in order to protect devices in the electrical cabinet against damaging electromagnetic charges.

For example, the document WO 2012/034988 discloses a cable lead-through assembly comprising a frame in which a grid element is inserted. The grid element comprises a number of circular openings. Each opening is, depending on its size, configured for receiving a cable of a corresponding size. Each cable is fixed to the grid element such that the axial forces applied to the cable are transferred to the grid element.

SUMMARY

However, the cable lead-through assemblies as described above have several drawbacks.

For example, the assembling of these cable lead-through assemblies, and the introduction of the cables into such lead-through assemblies, is complex and time-consuming. Furthermore, these cable lead-through assemblies are not flexible in terms of the number and types of cables that can be accommodated.

The present disclosure aims to resolve the aforementioned problems by providing a cable lead-through assembly that allows a fast and easy pulling through of the cables and that allows for a greater flexibility at the same time.

To that end, a cable lead-through assembly is provided comprising:
- a frame delimiting a cable reception space defining a cable lead-through direction;
- an in-frame sub-system configured for securing cables to the frame, the in-frame sub-system comprising:
  - at least two plates intended for extending in said cable reception space substantially parallel to one another and to the cable lead-through direction, the plates being configured for being coupled to the frame and for forming between each other at least one cable's path for at least one cable;
  - securing means configured for securing the or each cable to a corresponding plate such that the or each cable extends along the cable lead-through direction when the corresponding plate is coupled to the frame; and
- a locking unit coupled to the frame, the locking unit having an at-rest configuration in which the plates are movable relative to one another and relative to the frame along a locking direction perpendicular to the cable lead-through direction and an operational configuration in which the locking unit locks the at least two plates in position relatively to the frame along the locking direction with the or each cable pinched between two adjacent plates, the locking unit being configured for displacing the at least two plates in translation along the locking direction when moving between its at-rest configuration and its operational configuration.

According to advantageous but not mandatory aspects of the invention, such a cable lead-through assembly may comprise one or several of the following features, taken in any technically possible combination:
- each plate defines at least two attachment through-holes, the securing means being intended to extend through said attachment through-holes,
- the in-frame sub-system further comprises, for at least one plate, at least two compressible pads, each compressible pad being attached to a corresponding face of the plate,
- the or each compressible pad is made at least partially of a material conducting electricity,
- each compressible pad is deformable between an uncompressed state and a compressed state and, in the uncompressed state, each compressible pad having a parallelepiped shape,
- each compressible pad comprises a core made of a foam material and a cover covering said core over at least a fraction of its surface,
- the securing means are configured for attaching the at least one cable to the plate such that the cable bears directly against the compressible pad over a first portion of its length,
- the locking unit comprises a locking plate and at least one locking mechanism, configured for displacing said locking plate in translation along the locking direction,
- the locking mechanism comprises at least one lever mechanism, the lever mechanism comprising a first arm and a second arm, connected to each other through a central pivot joint, the first arm being connected to the frame at its end located opposite to the central pivot joint and the second arm being connected to the locking plate at its end located opposite the central pivot joint,
- the plates are configured for being inserted into the frame along an insertion direction parallel to the cable lead-through direction, the cable lead-through assembly further comprising a clamping device, said clamping device being configured for exerting a clamping force on the plates so as to clamp the plates against the frame along a direction parallel to the insertion direction of the plates,
- the clamping device is further configured for exerting a clamping force on the locking unit along a direction perpendicular to the locking direction,
- the cable lead-through assembly comprises a spacer intended to be inserted into the cable reception space so as to fill a space in the cable reception space and to extend parallel to the plates, the spacer being preferably configured to fill a space in the cable reception space between the locking unit and the plate closest to the locking unit along the locking direction.

An electrical assembly is also provided comprising at least one cable, and a cable lead-through assembly as described above.

An electrical cabinet is also provided comprising a housing delimiting an inner space, and a cable lead-through assembly as defined above intended to be fixed to the housing.

A method for assembling a cable lead-through assembly comprising the following successive steps:
- pulling the at least one cable through the frame such that it extends through the frame in the cable reception space;
- securing the at least one cable to the corresponding plate by means of the securing means;
- inserting each plate into the cable reception space along an insertion direction such that the plates extend in said cable reception space substantially parallel to one another and such that the or each cable extends substantially parallel to the cable lead-through direction;
- actuating the locking unit from its at-rest configuration to its operational configuration so as to displace the at least two plates in translation along the locking direction.

BRIEF DESCRIPTION OF THE DRAWINGS

Other features and advantages of the present disclosure will appear upon reading the following description, provided solely as an example and done in reference to the appended drawings, in which.

DETAILED DESCRIPTION

In the following specification, the expression "substantially parallel to" is understood to specify a parallelism of plus or minus 10 degrees, preferably of plus or minus 5 degrees. In addition, the expression "substantially perpendicular to" is understood to specify a perpendicular relation of plus or minus 10 degrees, preferably of plus or minus 5 degrees.

Figure 1:
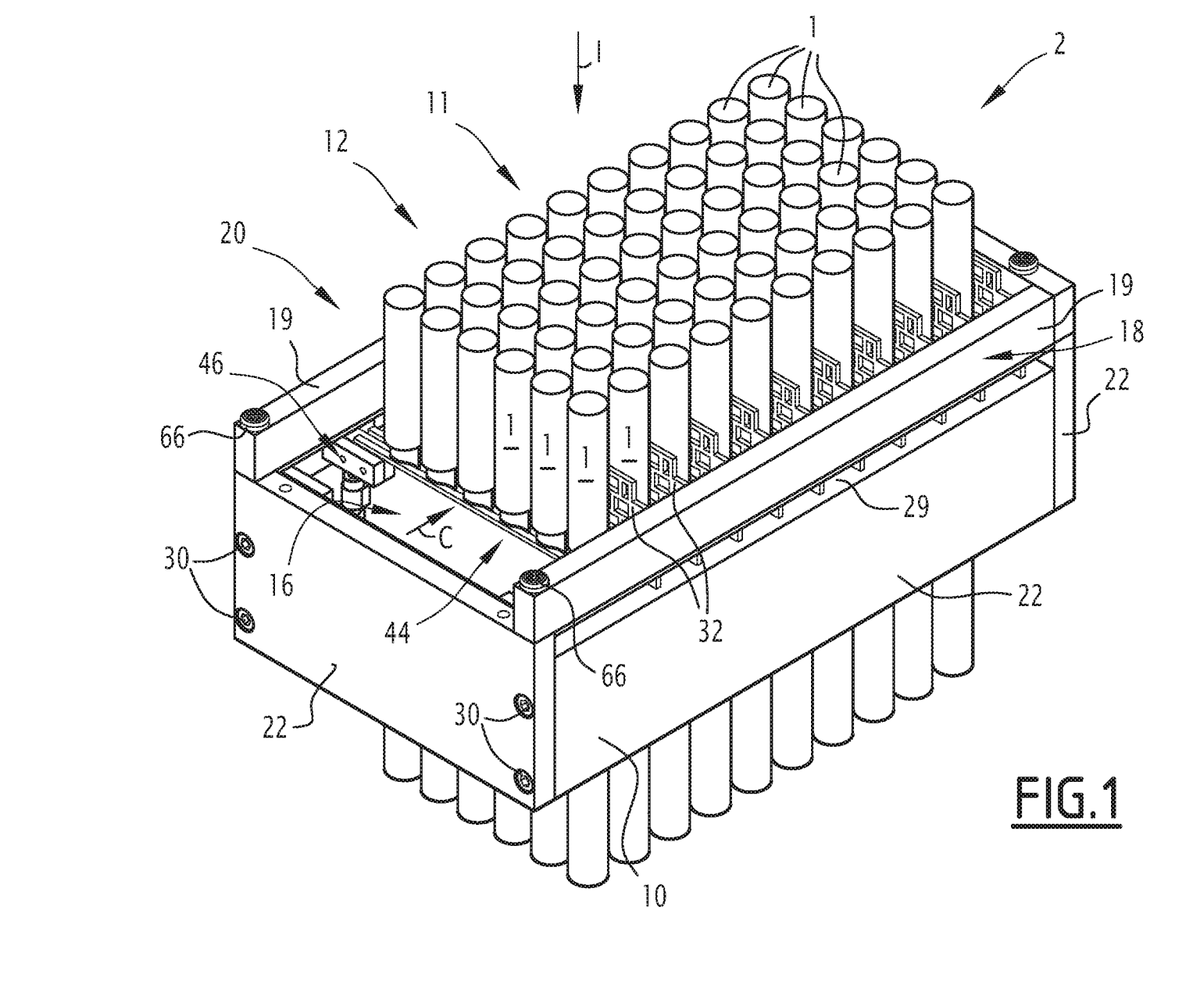
FIG. 1 shows a perspective view of an electrical assembly in accordance with an embodiment of the present invention.

With reference to FIG. 1, an electrical assembly is shown. The electrical assembly comprises at least one cable 1 and a cable lead-through assembly 2.

The cables 1 are for example power cables or communication cables.

Each cable 1 comprises, for example, a core, a cable shield 3 and a coating 4 surrounding the cable shield 3. A section of these cables 1 is intended to extend in the cable lead-through assembly 2. In the example shown in FIG. 3, at least a portion 5 of this section of each cable 1 is stripped up to the cable shield 3.

The cable shield 3 is for example configured to be electrically connected to the cable lead-through assembly 2.

The cable lead-through assembly 2 is intended to be fixed to a housing of an electrical cabinet. The housing delimits an inner space comprising, for example, electrical modules that are intended to be connected to the cables 1.

The cable lead-through assembly 2 is intended to be arranged in the inner space delimited by the housing. Preferably, the cable lead-through assembly 2 is connected to the housing through an electrically conductive connection.

The housing is advantageously electrically grounded. In this case, the cable shields 3 may be electrically connected to the ground through the cable lead-through assembly 2 and the housing.

As shown in FIG. 1, the cable lead-through assembly 2 comprises a frame 10 and an in-frame sub-system 11.

The in-frame sub-system 11 is configured for securing the cables 1 to the frame 10. The in-frame sub-system 11 comprises:
- at least two plates 32;
- securing means 14 configured for securing the or each cable 1 to a corresponding plate 32; and
- a lock in the form of a locking unit 16 coupled to the frame 10.

The frame 10 delimits a cable reception space 20 which is a volume having, for example, a parallelepiped shape. The frame 10 is intended to receive, in the cable reception space 20, a section of the cables 1 which are drawn through the cable reception space 20. For example, the cable reception space 20 is intended to receive at least the portion 5 of the cables 1 which is at least partially stripped up to the cable shield 3.

As shown in FIG. 1 and as will be explained more in detail below, the frame 10 further comprises a bearing surface 29, intended for supporting plates 32 (described more in detail below) of the in-frame sub-system 11.

In the example shown in the figures, the frame 10 has a substantially parallelepiped shape. It comprises four frame walls 22. The frame walls 22 are for example connected to each other by screws 30. Each frame wall 22 is for example made of a material comprising aluminum. Adjacent wall elements 22 extend substantially perpendicular to each other so as to form a substantially rectangular frame.

Figure 2:
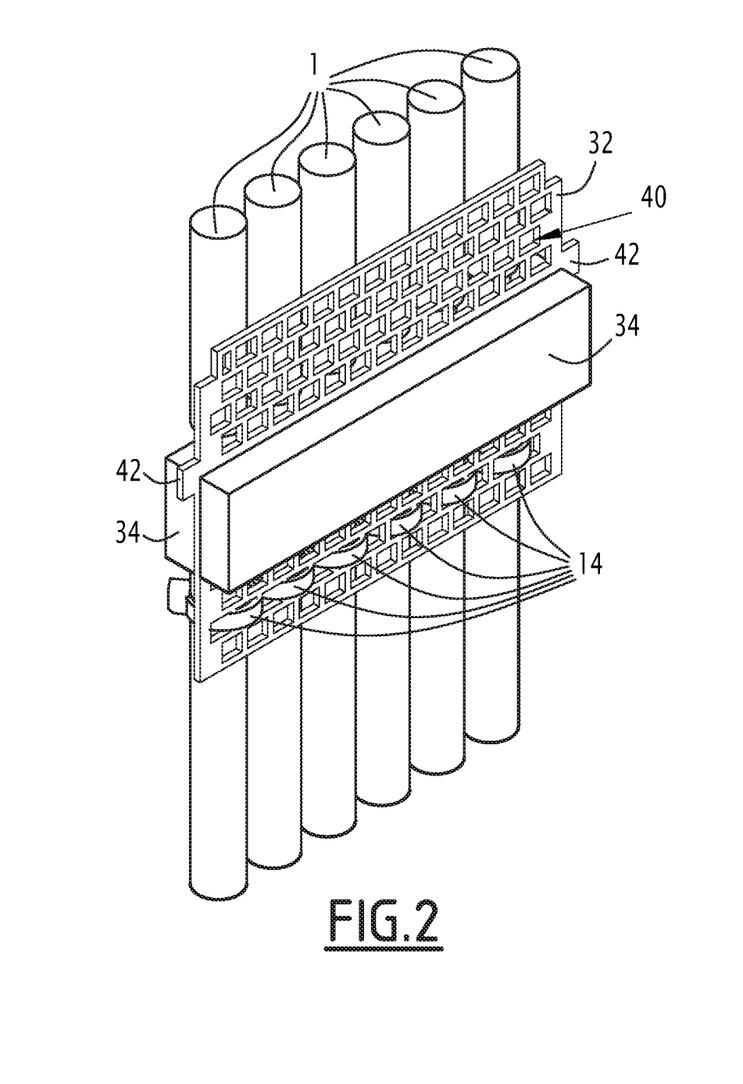
FIG. 2 shows a first perspective view of a portion of the electrical assembly shown in FIG. 1.
Figure 3:
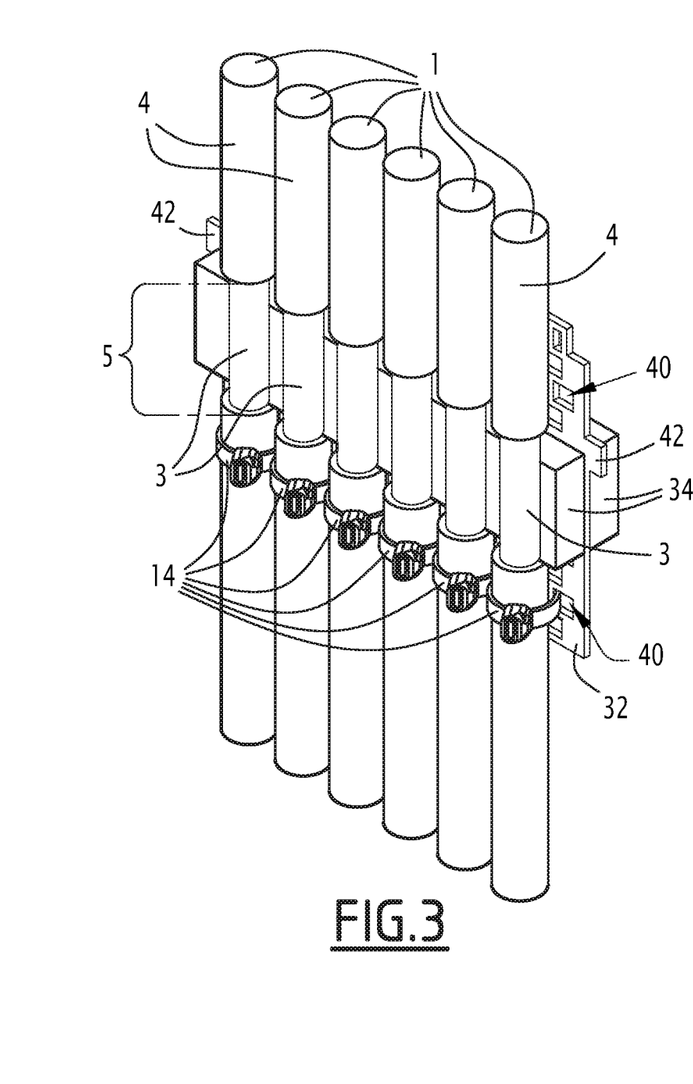
FIG. 3 shows a second perspective view of the portion of the electrical assembly shown in FIG. 2.

As shown more particularly in FIGS. 2 and 3, the in-frame sub-system 11 comprises at least two plates 32. In particular, the plates 32 are intended for extending in the cable reception space 20 substantially parallel to one another. They are configured for forming between each other, in particular between each couple of two adjacent plates 32, cables paths for the passage of the cables 1.

The plates 32 comprise a plurality of attachment through-holes 40 intended for attaching the cables 1 to the plates 32. The attachment through-holes 40 extend through the plates 32. In the example shown in the figures, the attachment through-holes 40 have a rectangular shape. However, any other appropriate shape could be used.

The attachment through-holes 40 define for example a grid pattern as visible in particular in FIG. 2. Such an arrangement of the attachment through-holes 40 allows varying the position of the cables 1 along the width of the corresponding plate 32 and to adapt the number of cables 1 attached to a given plate 32.

The plates 32 further comprise lugs 42 configured for hanging the plates 32 onto the frame 10 so as to couple the plates 32 to the frame 10. Each lug 42 is intended for bearing against the bearing surface 29 of the frame 10.

The plates 32 are configured to be inserted into the frame 10 along an insertion direction. The insertion direction is parallel to a cable lead-through direction I, which is the direction along which the cables 1 are intended to extend through the frame 10 in the cable lead-through assembly 2.

The plates 32 comprise two main opposite faces. As shown more particularly in FIGS. 2 and 3, for each plate, a compressible pad 34 is attached to each face of the plate 32. For example, the compressible pad 34 is glued to the corresponding face with an electrically conductive adhesive. For example, the two compressible pads 34 attached to opposite main faces of a given plate 32 are located in register with each other.

According to one example, the compressible pads 34 are identical.

The compressible pads 34 may comprise a material conducting electricity. More particularly, each compressible pad 34 may comprise a core and a cover covering the core. According to one example, the core is made of a foam material and the cover is made of an electrically conductive material, such as a metal.

The compressible pads 34 are deformable between an uncompressed state and a compressed state.

In the uncompressed state, as visible for example in FIG. 2, each compressible pad 34 has a parallelepiped shape. In particular, in the uncompressed state, the compressible pad 34 includes two parallel faces, extending parallel to the main faces of the plate 32 to which it is attached. The two parallel faces of the compressible pad 34 do not comprise any notches or recesses such as cable reception notches or recesses in the uncompressed state.

In the compressed state, the cables 1 bear against the compressible pads 34. In the compressed state, the compressible pads 34 delimit recesses having a shape that is complementary to that of the cables 1 attached thereto. These recesses define the cables paths for the passage of the cables between the plates 32.

As will be seen later, the compressible pads 34 are deformable between the uncompressed state and the compressed state through the action of a locking unit 16. The compressible pad 34 is configured in such a manner that the cable 1 is in direct contact therewith.

The securing means 14, as visible in particularly in FIGS. 2 and 3, are configured for securing the cables 1 to the plates 32. More particularly, the securing means 14 are intended to extend through the attachment through-holes 40 of the plates 32. The securing means 14 for example comprise a connector such as cable ties.

The securing means 14 and attachment through holes 40 are in particular configured for attaching the cable 1 directly to the plate 32 such that it bears directly against the compressible pad 34 over a first portion of its length. When it is attached to the plate 32, the cable 1 may further bear directly against the plate 32 over a second portion of its length, adjacent to the first portion.

Advantageously, the compressible pad 34 extends over only a fraction of the height of the plate 32, taken along the insertion direction I of the plates 32.

Preferably, as shown in the figures, the securing means 14 are configured for attaching the or each cable 1 to the corresponding plate 32 in an attachment zone which is located away from the compressible pad 34, and in particular not located in register with the compressible pad 34 along the normal to the plate 32. The attachment zone is for example located above or below the compressible pad 34 along the insertion direction. For example, as shown in FIGS. 2 and 3, for the or each cable 1, the securing means 14 extends through an attachment through-hole 40 located on the plate 34 away from the compressible pad 34, and more particularly below the compressible pad 34 along the insertion direction.

Advantageously, the cables 1 are stripped up to the cable shield 3 over a length greater than or equal to the height of the compressible pads 34, taken along the insertion direction I of the plates 32. In this case, the first portion of the cable 1 is stripped over its entire length. The second portion of the cable 1 may be stripped over a fraction of its length.

Each plate 32 is intended to have cables 1 attached thereto through securing means 14 on only one of its main faces.

The plates 32 and compressible pads 34 jointly form a plate assembly 12.

Figures 4, 5:
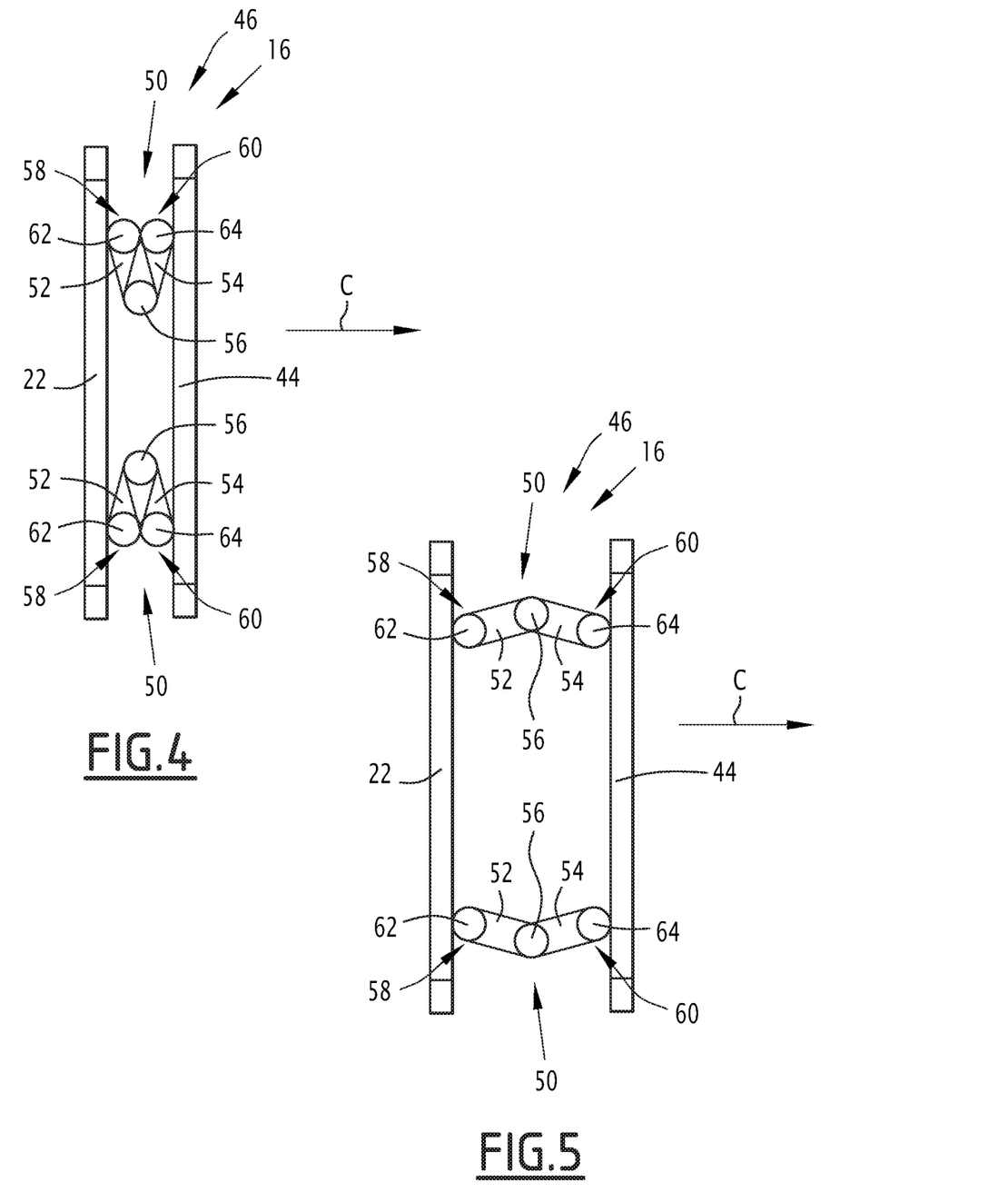
FIG. 4 schematically shows a side view of a locking unit of the electrical assembly of FIG. 1 in an at-rest configuration.
FIG. 5 schematically shows a side view the locking unit of FIG. 4 in an operational configuration.

The locking unit 16 is shown more particularly in FIGS. 4 and 5.

The locking unit 16 is movable between:

an at-rest configuration (shown for example in FIG. 4), in which the plates (32) are movable relative to one another and relative to the frame 10 along a locking direction C perpendicular to the cable lead-through direction I and to the insertion direction, and an operational configuration (shown for example in FIG. 5) in which the locking unit 16 locks the at least two plates 32 in position relatively to the frame 10 along the locking direction C with the or each cable 1 pinched between two adjacent plates 32, and more particularly between the compressible pads 34 thereof.

The locking direction C extends substantially perpendicular to the plane of the main faces of the plates 32.

The locking unit 16 is configured for displacing the at least two plates 32 and the or each cable 1 attached thereto in translation along the locking direction C when moving between its at-rest configuration and its operational configuration.

More particularly, the locking unit 16 comprises a locking plate 44 and a locking mechanism 46.

The locking mechanism 46 is configured for displacing the locking plate 44 in translation along the locking direction C between the at-rest position and the operational position.

In the at-rest configuration, the locking plate 44 is spaced away from the plate assembly 12. It does not exert any locking or compression force on the assembly formed by the plates 32 inserted into the frame.

In the operational configuration, the locking unit 16 exerts a locking or compression force on the plate assembly 12 though the locking plate 44.

The locking plate 44 extends in the cable reception space 20 substantially parallel to the plates 32. It comprises two parallel main faces. A first main face of the locking plate 44 is connected to the locking mechanism 46. A compressible pad 34 may be attached to a second main face, opposed to the first main face. For example, the compressible pad 34 is glued to the second main face of the locking plate 44 with an electrically conductive adhesive. The second main face is oriented towards the plate assembly 12.

The locking mechanism 46 comprises for example two lever mechanisms 50. Each lever mechanism 50 comprises a first arm 52 and a second arm 54, connected to each other through a central pivot joint 56. The first arm 52 is connected to the frame 10 at its distal end 58 located opposite to the central pivot joint 56 and the second arm 54 is connected to the locking plate 44 at its distal end 60 located opposite the central pivot joint 56. As shown in FIGS. 4 and 5, the distal end 58 of the first arm 52 is connected to the frame wall 22 through a pivot joint, configured for enabling a rotation of the first arm 52 relative to the frame 10 and the distal end 60 is connected to the locking plate through a pivot joint 64 configured for enabling a rotation of the second arm 54 relative to the locking plate 44.

Actuation of the locking mechanism 46 results in a corresponding translation of the locking plate 44 along the locking direction C. More particularly, actuation of the locking mechanism 46 changes the angle formed between the arms 52, 54 of the lever mechanisms 50. The first arm 52 and the second arm 54 thus exert a force on the locking plate 44 displacing the locking plate 44 in translation along the locking direction C towards the plate assembly. For example, the locking mechanism may be actuated using a screwdriver or by hand.

The cable lead-through assembly 2 may further comprise a clamp in the form of a clamping device 18 configured for exerting a clamping force on the plates 32 so as to clamp the plates 32 against the frame 10 along the cable lead-through direction I. More specifically, the clamping device 18 is configured for exerting a clamping force on the lugs 42 of the plates 32.

Furthermore, the clamping device 18 is configured for exerting a clamping force on the locking unit 16 along a direction perpendicular to the locking direction C, for example along the cable lead-through direction I, so as to secure the locking unit 16 in the operational configuration.

The clamping device 18 is configured for being attached to the frame 10 for example through screws 66.

More particularly, the clamping device 18 comprises at least one clamping bar 19, having, for example, a parallelepiped shape. It is made in particular of a material comprising aluminum.

The clamping bar 19 extends from a first end to a second end of the frame 10. It extends substantially parallel to a frame wall 22 of the frame 10 at a distance thereto, taken along the cable lead-through direction I.

In the example shown in FIG. 1, the cable lead-through assembly 2 comprises two substantially parallel clamping bars 19. Each bar 19 extends in register with a corresponding frame wall 22 along the cable lead-through direction I so as to be able to clamp the plates 32 against this frame wall 22.

Figure 6:
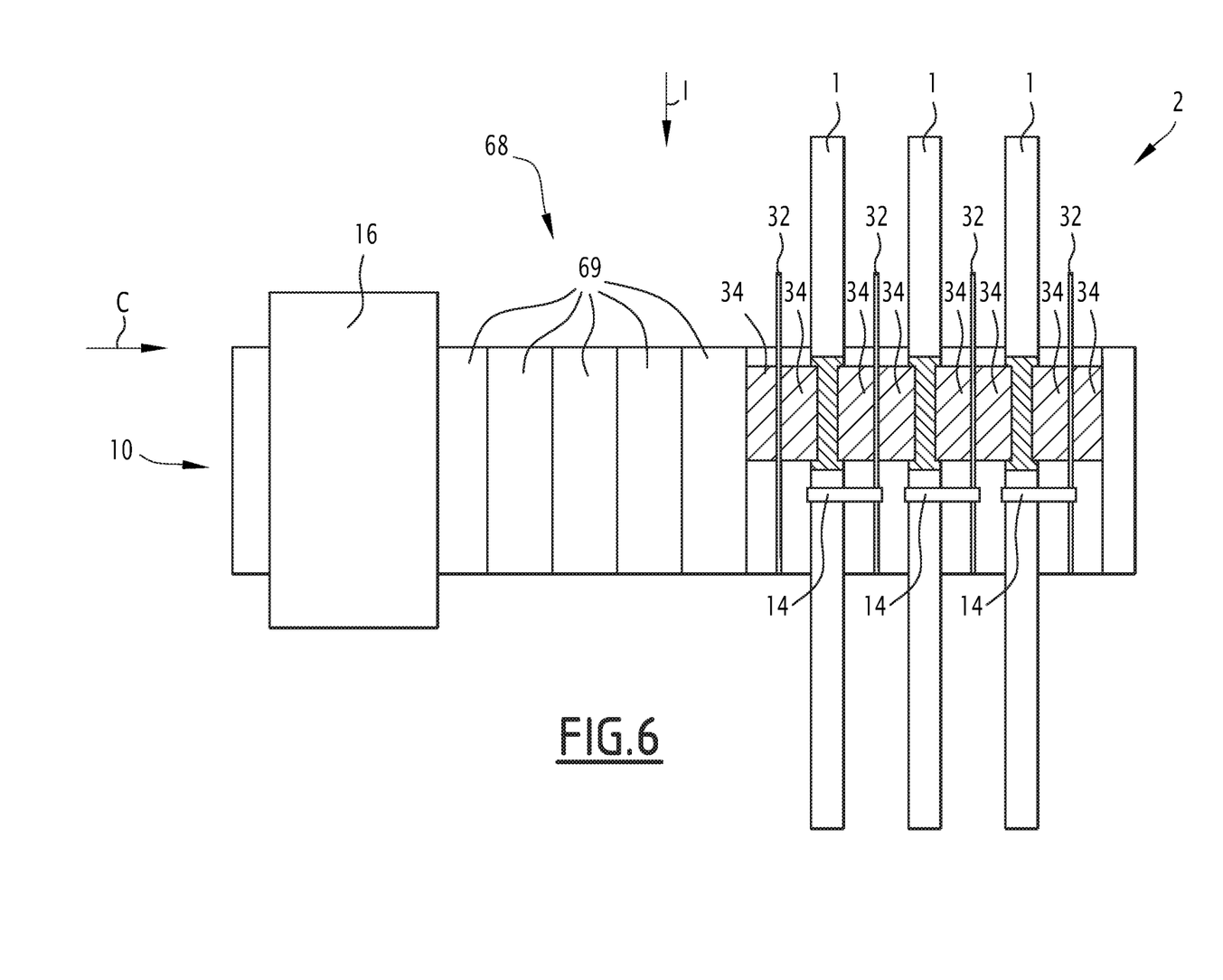
FIG. 6 schematically shows a side of an electrical assembly in accordance with another embodiment of the present invention.

In the assembled position, the lugs 42 on each side of the plates 32 are sandwiched, along the cable lead-through direction I, between the frame 10 and a corresponding bar 19. Optionally, as shown in FIG. 6, the cable lead-through assembly 2 further comprises a spacer 68.

The spacer 68 comprises for example one single element or a plurality of elements 69 intended to extend substantially parallel to one another and to the cable lead-through direction I.

The spacer 68 is intended to be inserted into the cable reception space 20 and to extend parallel to the plates 32. The spacer 68 is configured to fill a space in the cable reception space 20, for example between the locking unit 16 and the plate 32 closest to the locking unit 16 along the locking direction C. The spacer 68 is further configured to transmit the force exerted by the locking unit 16 to the plates 32.

For example, the spacer 68, and more particularly each spacer element 69, comprises lugs configured for the hanging of the spacers 68 onto the frame 10. The spacer 68, and for example each spacer element 69, is connected to the frame 22 in the exactly same way as the plates 32, via the lugs.

Such spacer 68 is used in case there is a space between the locking unit 16 and the plate 32 closest thereto, even after maximum extension of the locking unit 16.

In the following, an example of a method for assembling the cable lead-through assembly 2 will be described.

In an insertion step, the cables 1 are pulled through the frame 10 such that they extend through the frame 10 in the cable reception space 20. The cables 1 are then stripped up to the cable shield 3 over a portion of their length which is intended to extend in the cable lead-through assembly 2.

In an attaching step, the cables 1 are attached to corresponding plates 32 by means of the securing means 14.

More particularly, during the attaching step, the cables 1 are attached directly to the corresponding plates 32 through the securing means 14 such that each cable 1 bears directly against the compressible pad 34 over a first portion of its length. The cable 1 may further bear against the corresponding plate 32 over a second portion of its length, adjacent to the first portion.

In particular, during the attaching step, the securing means 14 are drawn through the attachment through-holes 40 and around the cables 1. The attaching step is advantageously carried out while the plates 32 are located outside the cable reception space 20.

Advantageously, the compressible pads 34 are, at the end of the attaching step 34, in the uncompressed state.

For example, the compressible pads 34 are only deformed from the uncompressed state to the compressed state due to a compression by the locking unit 16.

In a plate insertion step, the plates 32 are inserted into the frame 10 along the insertion direction so as to hang in the frame 10. In their inserted configuration, the lugs 42 of the plates 32 bear against with the bearing surface 29.

The attaching and insertion steps are repeated for each of the plates 32 that are to be inserted into the cable reception space 20.

In a first example, as shown for example in FIG. 1, the number of plates 32 received in the cable reception space 20 is such that the locking unit 16, and in particular the locking plate 44, is able to exert the locking or compression force on the plate assembly 12.

In a second example, as shown for example in FIG. 6, the number of plates 32 received in the reception space 20 is such that the distance between the locking unit 16 and the closest plate 32 is too great to allow a locking of the plate assembly 12 by the locking unit 16. In this second example, spacer 68 is inserted into the cable reception space 20 between the locking plate 44 and the plate 32 closest thereto. The spacer 68 is configured to transmit to the plate assembly 12 the locking or compression force exerted by the locking unit 16, as described below.

In a locking step, the locking unit 16, and in particular the locking mechanism 46 displaces the locking plate 44 in translation along the locking direction C between the at-rest configuration (shown for example in FIG. 4) and the operational configuration (shown for example in FIG. 5). For this purpose, the locking mechanism 46 is actuated so that, for each lever mechanism 50, the angle between the first arm 52 and the second arm 54 increases, thus pushing the locking plate 44 towards the plate assembly 12 along the locking direction C.

In the operational configuration, the locking unit 16, and in particular the locking plate 44, exerts the locking or compression force on the plate assembly 12, possibly via the spacers 68. In the operational configuration, the compressible pads 34 are in their compressed state as described above.

In the operational configuration, the or each cable 1 is in direct surface contact over at least a portion of its length, and preferably over the first portion described above, with the compressible pad 34 of the plate 32 to which it is secured and with the compressible pad 34 of the plate 32 adjacent to the cable 1 according to the locking direction C. More particularly, in the operational configuration, each cable 1 is received in the complementary recesses formed in the adjacent compressible pads 34 in the compressed state of the compressible pads 34. As mentioned above, these recesses are created due to the compression exerted on the plate assembly 12 by the locking unit 16 in the operational configuration.

In an optional fixing step, the clamping device 18 is then fixed to the frame 10 so as to clamp the plates 32 against the frame 10 along the cable lead-through direction I. More specifically, the clamping device 18 exerts a clamping force on the lugs 42 of each plate 32. Furthermore, the clamping device 18 exerts a clamping force on the locking unit 16 along a direction perpendicular to the locking direction C, for example along the cable lead-through direction I, such that the locking unit 16 is secured in the operational configuration by the clamping force.

It is understood that with the cable lead-through assembly 2 and the related assembling method, it is possible to assemble the cables 1 in the cable reception space 20 in a fast and easy way. Indeed, a single person is able to draw cables 1 through the cable lead-though assembly 2, to fix the cables 1 on the plates 32 and insert the plates 32 with the attached cables 1 into the cable reception space 20, compared to cable lead-through assemblies of the state of the art where at least two people are required for assembling the cable lead-through assembly.

The fact that the cables 1 may be attached to the plates 32 outside the cable reception space 20 defined by the frame 10 allows an easy assembling also on electrical cabinets where only few space is available.

Furthermore, the space in the cable reception space 20 is used more efficiently, as the distance between the plates 32 is adaptable according to a diameter of the inserted cables 1.

In addition, the fact that the cable shield of the cables 1 is electrically connected to the cable lead-through assembly 2, which is electrically connected to the grounded electrical cabinet, allows discharging undesired electromagnetic loads off the cables 1.

Finally, the assembly 2 is very versatile, since the sites for receiving the cables 1 are not predefined as regards their position and geometry but may rather be varied depending on the size and number of cables 1 that are to be received in the cable lead-through assembly 2.

The invention claimed is:

1. A cable lead-through assembly comprising:
   a frame delimiting a cable reception space defining a cable lead-through direction;
   an in-frame sub-system configured for securing cables to the frame, the in-frame sub-system comprising:
      at least two plates configured for extending in the cable reception space substantially parallel to one another and to the cable lead-through direction, the at least two plates being configured for being coupled to the frame and for forming between each other at least one cable path for at least one of the cables;
      a connector configured for securing the at least one cable to a corresponding one of the plates such that the at least one cable extends along the cable lead-through direction when the corresponding plate is coupled to the frame; and
      a lock coupled to the frame, the lock having an at-rest configuration in which the plates are movable relative to one another and relative to the frame along a locking direction perpendicular to the cable lead-through direction and an operational configuration in which the lock locks the at least two plates in position relatively to the frame along the locking direction with the or each cable pinched between two adjacent plates, the lock being configured for displacing the at least two plates in translation along the locking direction when moving between the at-rest configuration and the operational configuration,
      wherein each plate defines at least two attachment through-holes, the connector being configured to extend through the at least two attachment through-holes.

2. The cable lead-through assembly according to claim 1, wherein the in-frame sub-system further comprises, for at least one plate, at least two compressible pads, each compressible pad being attached to a corresponding face of the plate.

3. The cable lead-through assembly according to claim 2, wherein at least one of the compressible pads is made at least partially of a material conducting electricity.

4. The cable lead-through assembly according to claim 2, wherein each compressible pad is deformable between an uncompressed state and a compressed state and wherein, in the uncompressed state, each compressible pad has a parallelepiped shape.

5. The cable lead-through assembly according to claim 2, wherein each compressible pad comprises a core made of a foam material and a cover covering the core over at least a fraction of a surface of the core.

6. The cable lead-through assembly according to claim 2, wherein the connector is configured for attaching the at least one cable to the plate such that the at least one cable bears directly against the compressible pad over a first portion of a length of the at least one cable.

7. The cable lead-through assembly according to claim 1, wherein the lock comprises a locking plate and at least one locking mechanism, configured for displacing the locking plate in translation along the locking direction.

8. The cable lead-through assembly according to claim 7, wherein the locking mechanism comprises at least one lever mechanism, the lever mechanism comprising a first arm and a second arm, connected to each other through a central pivot joint, the first arm being connected to the frame at an end of the first arm located opposite to the central pivot joint and the second arm being connected to the locking plate at an end of the second arm located opposite the central pivot joint.

9. The cable lead-through assembly according to claim 1, wherein the plates are configured for being inserted into the frame along an insertion direction parallel to the cable lead-through direction, the cable lead-through assembly further comprising a clamp, the clamp being configured for exerting a clamping force on the plates so as to clamp the plates against the frame along a direction parallel to the insertion direction of the plates.

10. The cable lead-through assembly according to claim 9, wherein the clamp is further configured for exerting a clamping force on the lock along a direction perpendicular to the locking direction.

11. The cable lead-through assembly according to claim 1, further comprising a spacer configured to be inserted into the cable reception space so as to fill a space in the cable reception space and to extend parallel to the plates.

12. The cable lead-through assembly according to claim 11, wherein the spacer is configured to fill a space in the cable reception space between the lock and the plate closest to the lock along the locking direction.

13. An electrical assembly comprising:
at least one cable; and
the cable lead-through assembly according to claim 1.

14. An electrical cabinet comprising:
a housing delimiting an inner space;
the cable lead-through assembly according to claim 1 configured to be fixed to the housing.

15. A method for assembling the cable lead-through assembly according to claim 1, the method comprising the following successive steps:
pulling the at least one cable through the frame such that at least one cable extends through the frame in the cable reception space;
securing the at least one cable to the corresponding plate by the connector;
inserting each plate into the cable reception space along an insertion direction such that the plates extend in the cable reception space substantially parallel to one another and such that the at least one cable extends substantially parallel to the cable lead-through direction; and
actuating the lock from the at-rest configuration to the operational configuration so as to displace the at least two plates in translation along the locking direction.

16. A cable lead-through assembly comprising:
a frame delimiting a cable reception space defining a cable lead-through direction;
an in-frame sub-system configured for securing cables to the frame, the in-frame sub-system comprising:
at least two plates configured for extending in the cable reception space substantially parallel to one another and to the cable lead-through direction, the at least two plates being configured for being coupled to the frame and for forming between each other at least one cable path for at least one of the cables;
a connector configured for securing the at least one cable to a corresponding one of the plates such that the at least one cable extends along the cable lead-through direction when the corresponding plate is coupled to the frame; and
a lock coupled to the frame, the lock having an at-rest configuration in which the plates are movable relative to one another and relative to the frame along a locking direction perpendicular to the cable lead-through direction and an operational configuration in which the lock locks the at least two plates in position relatively to the frame along the locking direction with the or each cable pinched between two adjacent plates, the lock being configured for displacing the at least two plates in translation along the locking direction when moving between the at-rest configuration and the operational configuration,
wherein the lock comprises a locking plate and at least one locking mechanism, configured for displacing the locking plate in translation along the locking direction,
wherein the locking mechanism comprises at least one lever mechanism, the lever mechanism comprising a first arm and a second arm, connected to each other through a central pivot joint, the first arm being connected to the frame at an end of the first arm located opposite to the central pivot joint and the second arm being connected to the locking plate at an end of the second arm located opposite the central pivot joint.

* * * * *